US006275754B1

(12) United States Patent
Shimizu et al.

(10) Patent No.: US 6,275,754 B1
(45) Date of Patent: *Aug. 14, 2001

(54) AUTOMATIC STEERING SYSTEM FOR VEHICLE

(75) Inventors: Yasuo Shimizu; Katsuhiro Sakai, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/610,899

(22) Filed: Jul. 6, 2000

Related U.S. Application Data

(62) Division of application No. 09/547,712, filed on Apr. 11, 2000, which is a continuation of application No. 08/947,328, filed on Oct. 8, 1997, now abandoned.

(30) Foreign Application Priority Data

Oct. 9, 1996 (JP) .................................................. 8-268676
Oct. 9, 1996 (JP) .................................................. 8-268677

(51) Int. Cl.[7] ............................. G06F 17/00; G05D 1/00
(52) U.S. Cl. ............................ 701/41; 701/23; 701/26; 180/167; 180/412; 180/443; 318/587; 318/568.1
(58) Field of Search .................. 701/41, 36, 23, 701/24, 25, 26, 28, 300; 180/167, 168, 169, 421, 422, 413, 412, 443, 446; 318/587, 568.1, 568.12, 568.13

(56) References Cited

U.S. PATENT DOCUMENTS

| | | | |
|---|---|---|---|
| 5,076,382 | * 12/1991 | Vaughn et al. | 180/140 |
| 5,107,946 | 4/1992 | Kamimura et al. | 180/169 |
| 5,234,070 | 8/1993 | Noah et al. | 180/169 |
| 5,245,422 | * 9/1993 | Borcherts et al. | 701/41 |
| 5,332,057 | 7/1994 | Butsuen et al. | 180/169 |
| 5,373,911 | 12/1994 | Yasui | 180/168 |
| 5,485,892 | 1/1996 | Fujita | 180/167 |
| 5,540,298 | 7/1996 | Yoshioka et al. | 180/169 |
| 5,610,816 | 3/1997 | Kim | 701/24 |
| 5,612,883 | 3/1997 | Shaffer et al. | 701/300 |
| 5,742,141 | 4/1998 | Czekaj | 318/587 |
| 5,764,015 | 6/1998 | Shimize et al. | 318/587 |
| 5,835,870 | * 11/1998 | Kagawa | 701/23 |
| 5,875,408 | * 2/1999 | Bendett et al. | 701/23 |
| 5,945,799 | 8/1999 | Shimizu | 318/587 |

FOREIGN PATENT DOCUMENTS

| | | |
|---|---|---|
| 62-278477 | 12/1987 | (JP) . |
| 3-74256 | 3/1991 | (JP) . |
| 4-55168 | 2/1992 | (JP) . |

* cited by examiner

Primary Examiner—Jacques H. Louis-Jacques
(74) Attorney, Agent, or Firm—Arent Fox Kintner Plotkin & Kahn

(57) ABSTRACT

An automatic steering system for a vehicle is provided which includes a memory section for storing data for a steering angle of a wheel with respect to a distance of movement of a vehicle in correspondence to four parking modes. If a desired parking mode is selected by a mode selecting switch and the vehicle is moved at a creep while depressing a brake pedal, a control section controls the operation of a steering actuator to perform automatic parking control. At this time, an object detector continuously detects the position of an object around or in the vicinity of the subject vehicle, and when there is an obstacle already existing within a locus of movement of the subject vehicle, or when there is a possibility that a moving obstacle may enter into the locus of movement of the subject vehicle, a warning is provided to a driver, and an automatic brake is operated. Thus, it is possible to reliably perform the automatic parking control when there is an obstacle.

4 Claims, 18 Drawing Sheets

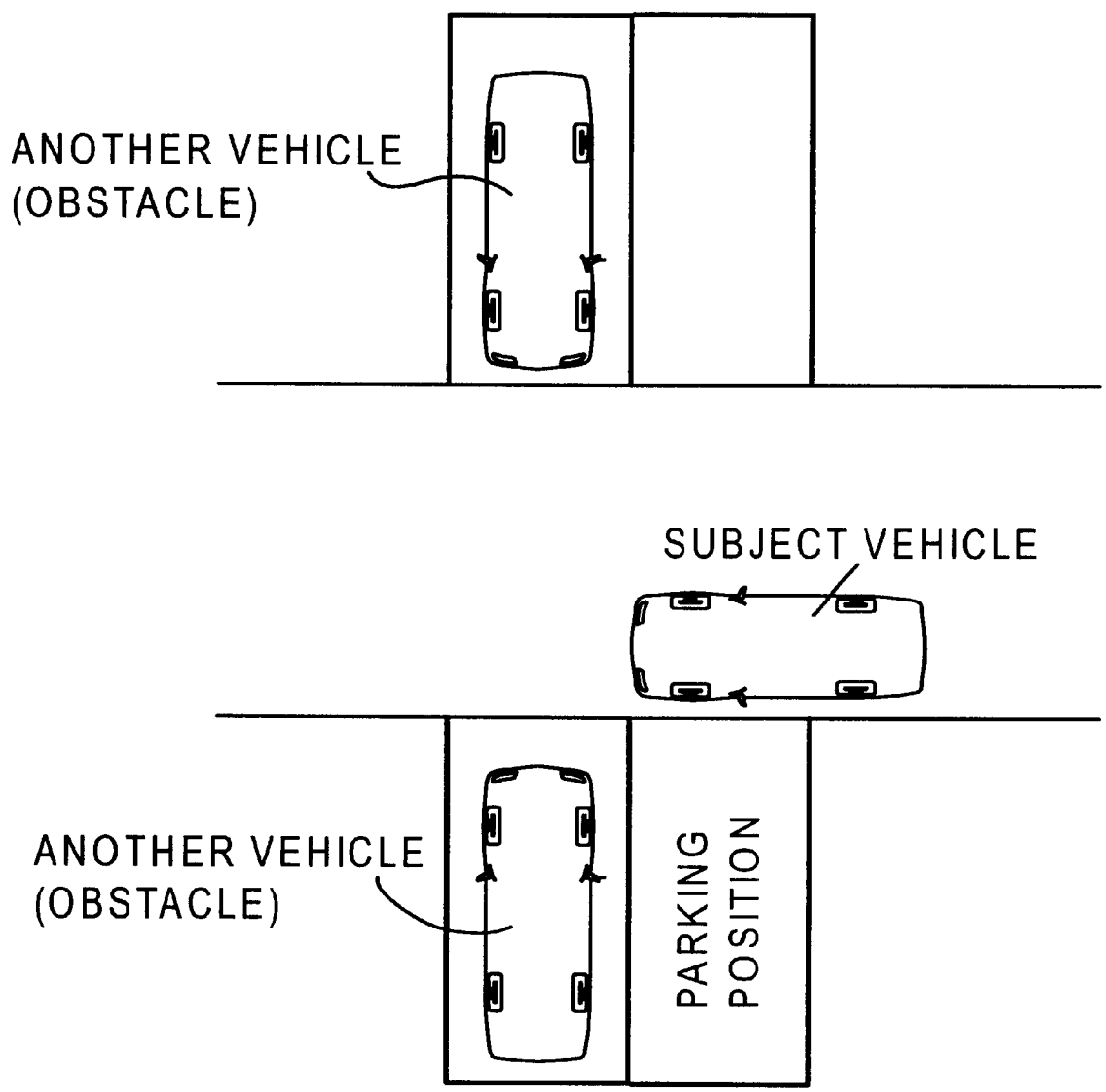

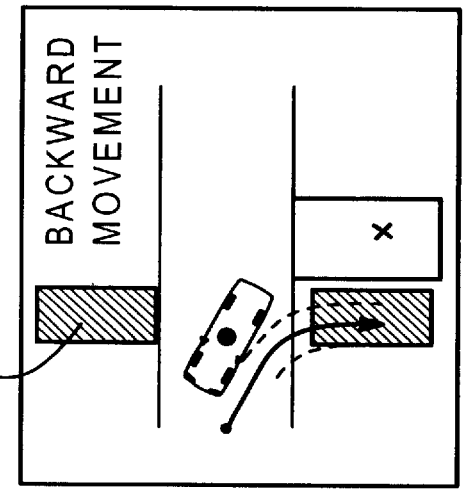
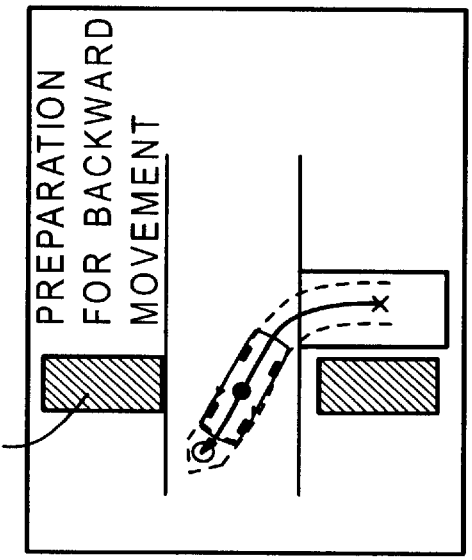
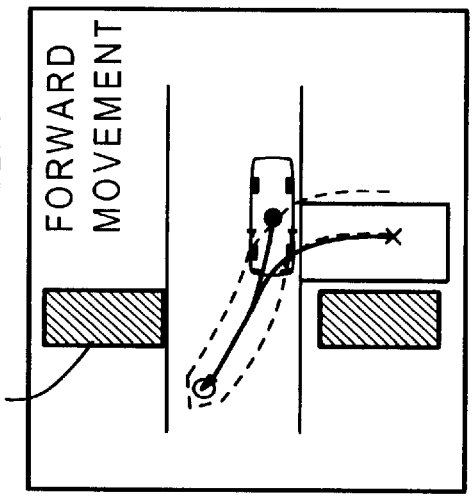

VOICE : AN OBSTACLE IS WITHIN PRESUMED
LOCUS OF MOVEMENT

VOICE : BE CAREFUL, AN OBSTACLE IS APPROACHING

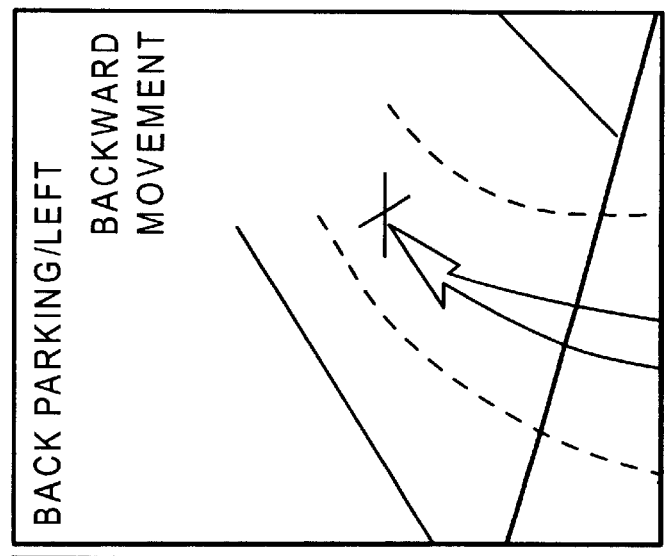
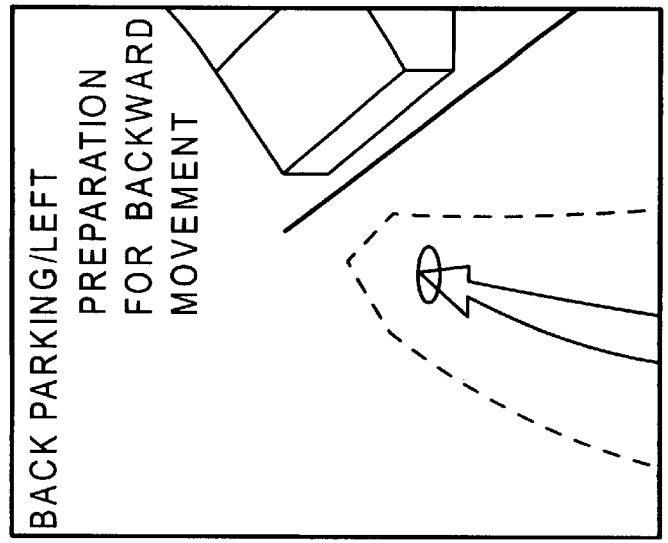
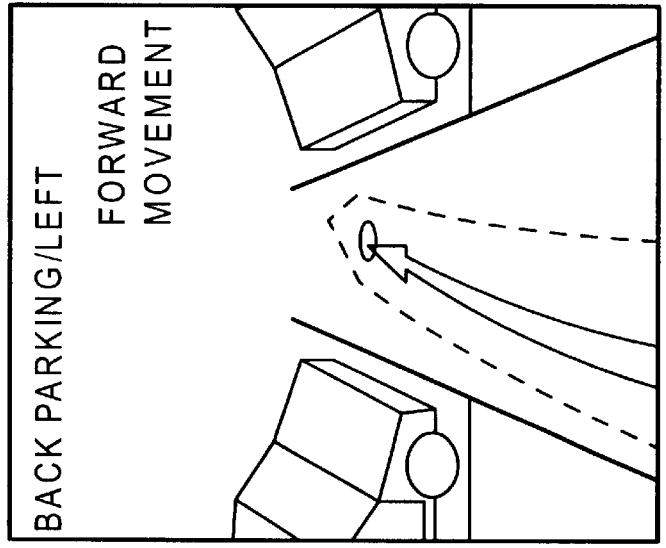

$\alpha = \dfrac{L}{2}$

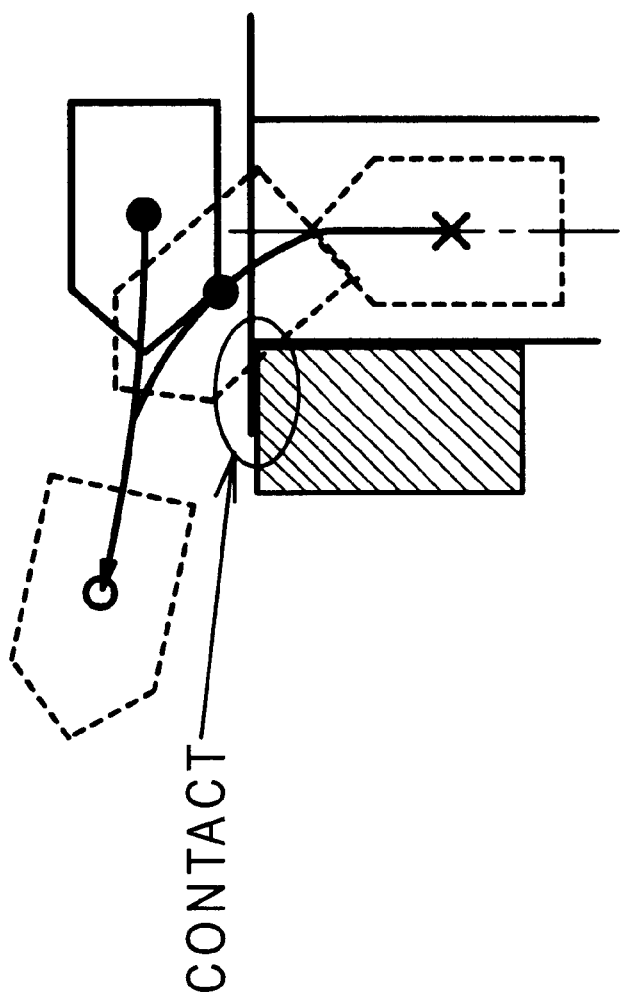

AUTOMATIC STEERING SYSTEM FOR VEHICLE

This is a divisional application of U.S. patent application Ser. No. 09/547,712, filed Apr. 11, 2000, which is a continuation application of U.S. patent application Ser. No. 08/947,328, filed Oct. 8, 1997 now abandoned.

BACKGROUND OF THE INVENTION

1. Field of the Invention

The present invention relates to an automatic steering system for a vehicle for garaging the vehicle without recourse to a steering by a driver.

2. Description of the Prior Art

Such automatic steering systems for vehicles are already known from Japanese Patent Application Laid-open No. 3-74256 and 4-55168. The automatic steering systems for vehicles utilize an actuator for a conventionally well-known power steering device, and are designed so that back parking and linear parking are automatically controlled by controlling the actuator based on the relationship between a previously stored distance of movement of the vehicle and a steering angle. There is also an automatic steering system which is already known from Japanese Patent Application Laid-open No. 62-278477 and which is designed, so that a warning is provided if an obstacle is detected within a presumed locus of movement of the subject vehicle during a parking operation provided by a driver.

If a warning device for emitting a warning by detecting an obstacle is combined with the automatic steering system for the vehicle, it is possible to further reliably carry out the automatic parking. In the warning device described in Japanese Patent Application Laid-open No. 62-278477, however, the warning is emitted immediately before contact of the vehicle with the object and hence, there is a possibility that the operation for keeping the vehicle from contacting the obstacle is not in time. In addition, if the warning is emitted during automatic parking, the parking operation is conducted again from the beginning, resulting in a troublesome operation.

The above known automatic steering system also suffers from the problem that the vehicle is moved from a start position through a previously stored locus of movement to a parking position and hence, if the start position is deviated, the parking position is also deviated. Additionally, the surrounding situation around the parking position (for example, the positions of other vehicles parked on left and right opposite sides and the like) is not taken into consideration and hence, a final parking position may deviate in some cases from an appropriate parking position depending upon the surrounding situation.

SUMMARY OF THE INVENTION

Accordingly, it is an object of the present invention to ensure that when there is one or more obstacles existing within a presumed locus of movement of a vehicle to be parked, or when the start position at which the automatic parking control is started has been deviated, automatic parking control can be reliably performed.

To achieve the above object, according to a first aspect and feature of the present invention, there is provided an automatic steering system for a vehicle, comprising a steering actuator for steering the wheels based on the steering operation provided by a driver, a memory means for previously storing the locus of movement of the vehicle to a target position, a control means for controlling the steering actuator based on contents stored in the memory means in place of the steering operation by the driver, and an object detecting means for detecting an object near the vehicle. The automatic steering system further includes a determining means for determining the presence or absence of an object or obstacle which exists within the locus of movement, or which will become an obstacle in the locus of movement, based on an output from the object detecting means, during the controlling of the steering actuator based on the contents stored in the memory means.

With the above arrangement, a contact avoiding measure can be taken to prevent the vehicle from contacting with the obstacle during the automatic parking control. Moreover, when there is an obstacle already existing within the locus of movement of the subject vehicle at the start of the automatic parking control, the need for a wasteful execution of the automatic parking control is eliminated, leading to a saving of time.

According to a second aspect and feature of the present invention, in addition to the first feature, the memory means stores the locus of movement of the vehicle as a steering angle of the wheel with respect to a distance of movement of the vehicle.

With the second feature, the constant locus of movement can be ensured irrespective of the magnitude of the vehicle speed during the automatic parking control.

According to a third aspect and feature of the present invention, in addition to the first or second feature, the automatic steering system further includes a notifying means for notifying a driver of the presence of an object, when the determining device determines that there is an object which becomes an obstacle.

With the third feature, it is possible to urge the driver to conduct an operation for keeping the vehicle from contacting the obstacle.

According to a fourth aspect and feature of the present invention, in addition to the first or second feature, the automatic steering system further includes an automatic vehicle-stopping means for automatically stopping the vehicle when the determining means determines that there is an object which becomes an obstacle.

With the fourth feature, it is possible to automatically avoid the contact of the vehicle with an object which becomes an obstacle.

According to a fifth aspect and feature of the present invention, in addition to the fourth feature, the vehicle includes an automatic transmission, and the operation of the automatic vehicle-stopping means is canceled by the operation of a brake input means by the driver, or by shifting the automatic transmission into a parking position.

With the fifth feature, it is possible to prevent the vehicle from starting to be moved at the time when the operation of the automatic vehicle-stopping means is canceled.

According to a sixth aspect and feature of the present invention, in addition to any of the first to fifth features, the steered wheels are front and rear wheels.

With the sixth feature, the vehicle is capable of a small sharp turn and hence, can be easily parked in a narrow area.

According to a seventh aspect and feature of the present invention, in addition to the first feature, the automatic steering system further includes a correcting means for correcting the contents stored in the memory means, when the determining means determines that there is an object which becomes an obstacle.

With the seventh feature, the locus of movement of the vehicle can be corrected in accordance with the deviation of the start position of the automatic parking control and with the situation of a surrounding obstacle around the parking position, whereby the vehicle can be reliably parked at an appropriate position.

According to an eighth aspect and feature of the present invention, in addition to the seventh feature, the correcting means corrects the relationship of the steering angle of the wheels to the distance of movement of the vehicle stored in the memory means.

With the eighth feature, it is possible to easily and reliably perform the correction of the locus of movement of the vehicle.

According to a ninth aspect and feature of the present invention, in addition to the seventh feature, the steered wheels are front and rear wheels, and the memory means stores a first locus of movement when one of the front and rear wheels is steered, and a second locus of movement when both of the front and rear wheels are steered.

With the ninth feature, it is possible to properly use the automatic parking control in a two-wheel steered state and the automatic parking control in a four-wheel steered state depending upon the deviation of the start position at which the automatic parking control is started, and the situation around the parking position.

According to a tenth aspect and feature of the present invention, in addition to the ninth feature, the first or second locus of movement is selected based on the result of the determination in the determining means.

With the tenth feature, it is possible to properly use the automatic parking control in the two-wheel steered state and the automatic parking control in the four-wheel steered state depending upon the deviation of the start position at which the automatic parking control is started, and the situation around the parking position, which is determined by the determining means.

The above and other objects, features and advantages of the invention will become apparent from the following description of the preferred embodiments taken in conjunction with the accompanying drawings.

BRIEF DESCRIPTION OF THE DRAWINGS

FIGS. 1 to 5 illustrate a first embodiment of the present invention, wherein:

FIG. 1 is an illustration of the entire arrangement of a vehicle equipped with a steering control unit.

FIG. 2 is an illustration for explaining the positional relationship between a vehicle, obstacles and a parking position.

FIGS. 3A to 3C are illustrations for explaining the operation in a back parking/left mode.

FIG. 4 is an illustration for explaining the operation when there is an obstacle within the locus of movement of the vehicle.

FIG. 5 is an illustration for explaining the operation when an obstacle enters into the locus of movement of the vehicle.

FIGS. 6A to 6C are illustrations similar to FIGS. 3A to 3C, but according to a second embodiment of the present invention.

FIGS. 7 to 8C illustrate a third embodiment of the present invention, wherein:

FIG. 7 is an illustration of the entire arrangement of a vehicle equipped with a front and rear wheel-steering control unit.

FIGS. 8A to 8C are illustrations for explaining the operation.

FIGS. 9 to 16 illustrate a fourth embodiment of the present invention, wherein:

FIG. 9 is an illustration of the entire arrangement of a vehicle equipped with a steering control unit.

FIG. 10 is an illustration for explaining the operation in a back parking/left mode.

FIG. 11 is an illustration for explaining the operation in the back parking/left mode in which the correction of the locus of movement is carried out.

FIG. 13 is an illustration for explaining the operation for the correction of the locus of movement.

FIG. 14 is an illustration for explaining the operation in a linear parking/left mode.

FIG. 15 is an illustration for explaining the operation in the linear parking/left mode in which the correction of the locus of movement is carried out.

FIGS. 17A and 17B and FIGS. 18A and 18B illustrate a fifth embodiment of the present invention, wherein:

FIGS. 17A and 17B are illustrations for explaining the operation in a back parking/left mode.

FIGS. 18A and 18B are illustrations for explaining the operation in a linear parking/left mode.

DETAILED DESCRIPTION OF THE PREFERRED EMBODIMENTS

The present invention will now be described by way of particular embodiments with reference to the accompanying drawings.

A first embodiment of the present invention will be described with reference to FIGS. 1 to 5.

Figure 1:
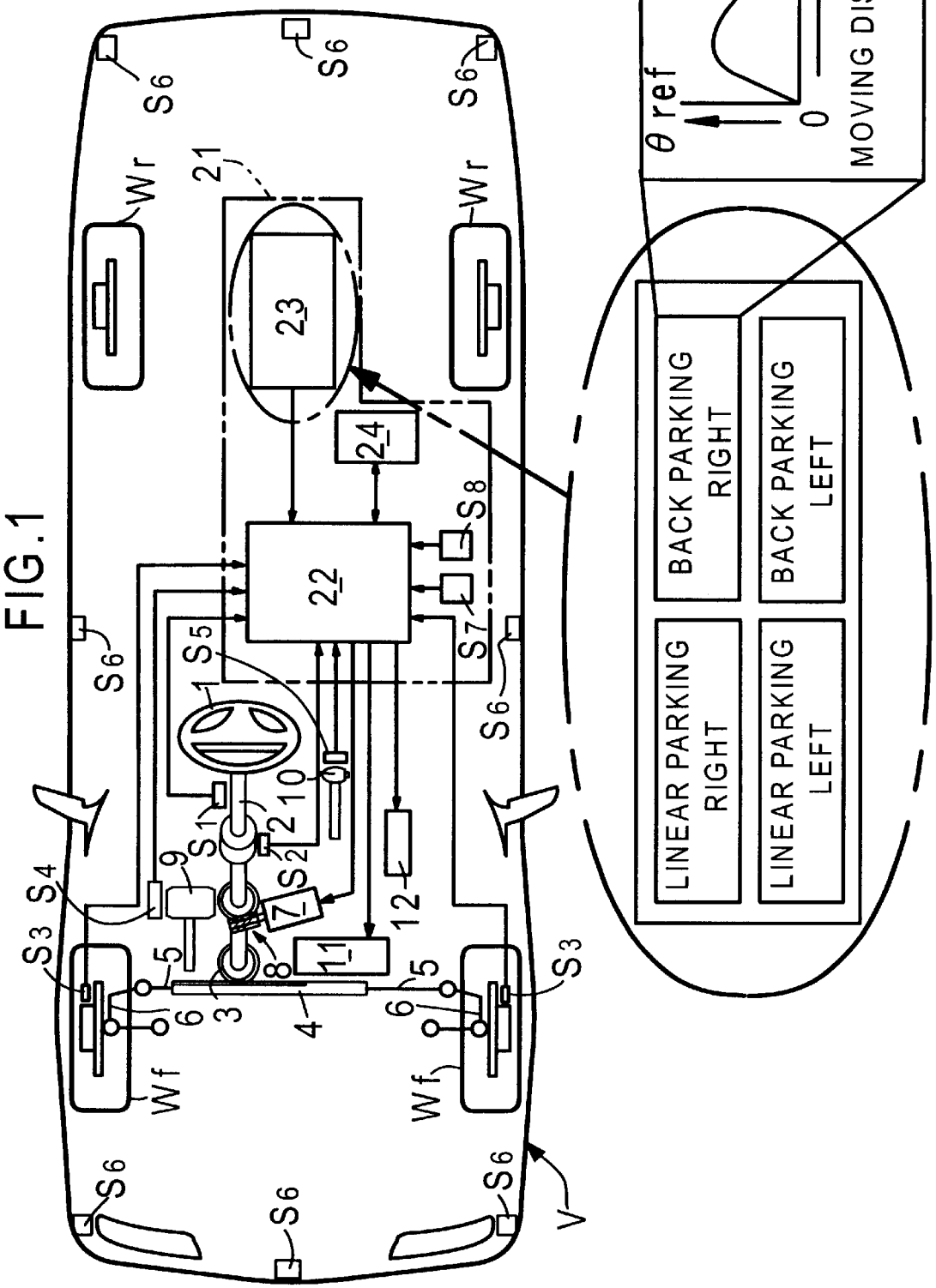

Referring to FIG. 1, a vehicle V includes a pair of front wheels Wf, Wf and a pair of rear wheels Wr, Wr. A steering wheel 1 and the front wheels Wf, Wf are interconnected by a steering shaft 2 rotated in unison with the steering wheel 1, a pinion 3 provided at a lower end of the steering shaft 2, a rack 4 meshed with the pinion 3, left and right tie rods 5, 5 provided at opposite ends of the rack 4, and left and right knuckles 6, 6 connected to the tie rods 5, 5. A steering actuator 7 having an electric motor is connected to the steering shaft 2 through a worm gear mechanism 8, in order to assist in the operation of the steering wheel 1 by a driver, or to conduct automatic steering for garaging of the vehicle (which will be described hereinafter).

A steering control unit 21 is comprised of a control section 22, a memory section 23 and a determining section 24. Inputted to the control section 22 are signals from a steering angle detecting means $S_1$ for detecting a steering angle $\theta$ of the front wheels Wf, Wf based on a rotational angle of the steering wheel 1, a steering torque detecting means $S_2$ for detecting a steering torque of the steering wheel 1, front wheel rotational angle detecting means $S_3$, $S_3$ for detecting rotational angles of the left and right front wheels Wf, Wf, a brake operation detecting means $S_4$ for detecting the operation (operational amount or amount of movement) of a brake pedal 9, a shift position detecting means $S_5$ for detecting the shift position selected by a select lever 10 (a "D" position, an "R" position, an "N" position, a "P" position or the like), and eight object detecting means $S_6$ mounted at a front portion, a central portion and a rear portion of the vehicle V. The object detecting means $S_6$ may be any known sonar or radar system. Lines connecting the eight object detecting means $S_6$ and the control section 22 are not shown for the purpose of preventing the complication of the drawings.

Further, a mode selecting switch $S_7$ and an automatic parking start switch $S_8$ operated by the driver, are connected to the control section 22. The mode selecting switch $S_7$ is operated to select any of four parking modes: a back-parking/right mode, a back-parking/left mode, a linear parking/right mode, and a linear parking/left mode. The automatic parking start switch $S_8$ is operated to start automatic parking in any mode selected by the mode selecting switch $S_7$.

Data for the four parking modes, i.e., relationships of reference steering angles θref to distances X of movement of the vehicle V are previously stored as a table in the memory section 23. The distance X of movement of the vehicle V, is calculated by multiplying the known peripheral length of the front wheel Wf by a rotational angle of the front wheel Wf detected by the front wheel rotational-angle detecting means $S_3$. Either one of a high-select value and a low-select value outputted from the pair of left and right front wheel rotational-angle detecting means $S_3$, $S_3$, and an average value of the high-select value and the low-select value is used for the calculation of the movement distance X.

The control section 22 controls the operation of the steering actuator 7, the operation of a brake actuator 12 (e.g., a hydraulic actuator for controlling the operations of brake cylinders for the front wheels Wf, Wf and the rear wheels Wr, Wr), and the operation of an operational stage display device 11 having a liquid crystal monitor, based on the signals from the detecting means $S_1$ to $S_6$ and the switches $S_7$ and $S_8$, the data for the parking modes stored in the memory section 23 and the presence or absence of an obstacle determined in the determining section 24. The operational stage display device 11 is provided with a speaker for providing a voice instruction to the driver.

The operation of the embodiment of the present invention having the above-described arrangement will be described below.

When the vehicle is in a usual state in which the automatic parking is not carried out (when the automatic parking start switch $S_8$ is not in an ON state), the steering control unit 21 functions as a regular power-steering control unit. More specifically, when the steering wheel 1 is operated by the driver to turn the vehicle V, the steering torque detecting means $S_2$ detects the steering torque inputted to the steering wheel 1, and the control section 22 of the steering control unit 21 drives the steering actuator 7 based on the steering torque. As a result, the left and right front wheels Wf, Wf are steered by the driving force from the steering actuator 7, whereby the steering operation by the driver is assisted.

The operation when the vehicle is in a situation as shown in FIG. 2 and is automatically parked, will be described with the back parking/left mode (the mode in which the parking is performed while the vehicle is being moved backwards to a parking position lying on the left side of the vehicle), as an example.

First, when the vehicle is close to a parking position, the driver operates the mode selecting switch $S_7$ to select the back parking/left mode, and picture images around the subject vehicle made based on the signals from the eight object detecting means $S_6$, are projected on the operational stage display device 11. Specifically, FIG. 3A shows the picture images on the operational stage display device 11 corresponding to FIG. 2. Shown in FIG. 3A are the picture images of two parked vehicles which are obstacles, the position of the subject vehicle shown by ●, a parking position shown by X, a shifting position (a position at which the forward movement of the vehicle is switched over to the backward movement) shown by ○, and a presumed path of movement of the subject vehicle from the position of the subject vehicle via the shifting position to the parking position. Further, the words "back parking/left" which is a selected mode and the words "forward movement" which is a current stage, are indicated on the operational stage display device 11.

When the automatic parking start switch $S_8$ is turned ON, an instruction "move the vehicle forwards slowly" is emitted from the speaker connected to the operational stage display device 11 by the voice. When the driver loosens the brake pedal 9 to move the vehicle in a forward creep travel, the front wheels Wf, Wf are automatically steered based on the data for the back parking/left mode selected by the mode selecting switch $S_7$, even if the driver does not operate the steering wheel 1.

More specifically, the control section 22 calculates a deviation E=(θref−θ) based on the reference steering angle θref in the back parking/left mode read out from the memory section 23 and the steering angle θ inputted from the steering angle detecting means $S_1$, and controls the operation of the actuator 7, so that the deviation E is equal to 0. At this time, data for the reference steering angle θref is set in correspondence to the distance X of movement of the vehicle and hence, even if there is a variation in vehicle speed in the creep travel, the vehicle is always moved on the locus of movement.

When the vehicle approaches the shifting position, the current stage indicated on the operational stage display device 11 is changed from "forward movement" to "preparation for backward movement", and an instruction "make a preparation for backward movement" is emitted from the speaker by the voice, as shown in FIG. 3B. When the vehicle has reached the shifting position and the driver stops the vehicle and operates the select lever 10 from the "D" position to the "R" position, the current stage indicated on the operational stage display device 11 is changed from "preparation for backward movement" to "backward movement", and an instruction "move the vehicle backwards slowly" is emitted from the speaker by the voice, as shown in FIG. 3C.

When the driver loosens the brake pedal 9 based on the instruction is from the speaker, the vehicle is moved in a backward creep travel along the locus of movement. Even in the case of the backward creep travel, the front wheels Wf, Wf are automatically steered based on the data for the back parking/left mode, even if the driver does not operate the steering wheel 1, as in the above-described forward creep travel. When the vehicle has reached the parking position, the driver depresses the brake pedal 9 to stop the vehicle based on the instruction from the speaker, and operates the select lever 10 from the "R" position to the "P" position, thereby completing the automatic parking control.

The automatic parking control by the above-described steering control device 21 is canceled when the driver turns OFF the mode selecting switch $S_7$. Further, in the following cases (1) to (3) in addition to the above case, the automatic parking control is canceled and restored to the usual power-steering control.

(1) When the driver has released his foot from the brake pedal 9;
(2) When the driver has operated the steering wheel 1; and
(3) When any of the object detecting means $S_6$ has detected an obstacle. In the case (3), an automatic brake is operated to prevent the vehicle from coming into contact with an obstacle.

The case (1) when the driver has released his foot from the brake pedal 9 will be first described. The automatic parking control is carried out while the driver is depressing the brake pedal 9 to conduct a creep or very slow driving condition. Therefore, when the driver has discontinued the braking operation, i.e., when the driver has released his foot from the brake pedal 9 to provide an operational amount detected by the brake operation detecting means $S_4$ which is equal to 0, or to provide a braking force low enough so that creeping has stopped, the automatic parking control is canceled and restored to the regular power-steering control.

In this way, by permitting the automatic parking control only in the state of a small amount of brake operation in a stage in which the driver has his foot on the brake pedal 9, the brake operation can be conducted without retard, when the driver has found an obstacle by himself during the automatic parking control and tries to stop the vehicle. When the driver has abandoned the parking and depresses the accelerator pedal during the automatic parking control, the automatic parking control is canceled when the driver releases his foot from the brake pedal 9 and hence, the need for the driver to turn OFF the mode selecting switch $S_7$ is eliminated, leading to an enhanced operability.

Next, the case (2) when the driver has operated the steering wheel 1 will be described. During the automatic parking control, it is unnecessary for the driver to operate the steering wheel 1, but the driver may be putting on his hands on the steering wheel 1 to provide for an emergency. When the driver has found an obstacle or the like during the automatic parking control and has operated the steering wheel 1 to keep away from the obstacle, the automatic parking control is canceled upon detection of a steering torque equal to or larger than a predetermined value by the steering torque detecting means $S_2$. In this way, by canceling the automatic parking control when the driver has operated the steering wheel 1, the interference between the driver's operation to keep away from the obstacle and the automatic parking control, is prevented and thus, it is possible to smoothly keep away from the obstacle.

Finally, the case (3) when any of the object detecting means $S_6$ has detected an obstacle will be described. By detecting continuously an obstacle present around the vehicle by any of the eight object detecting means $S_6$, it is determined by the determining section 24 whether there is an already existing obstacle stopped within a locus of movement of the vehicle. Further, with regard to a moving object such as a small animal, it is determined whether there is a possibility that the presumed locus of movement of the object may enter the locus of movement of the subject vehicle and thus become an obstacle.

Figure 4:
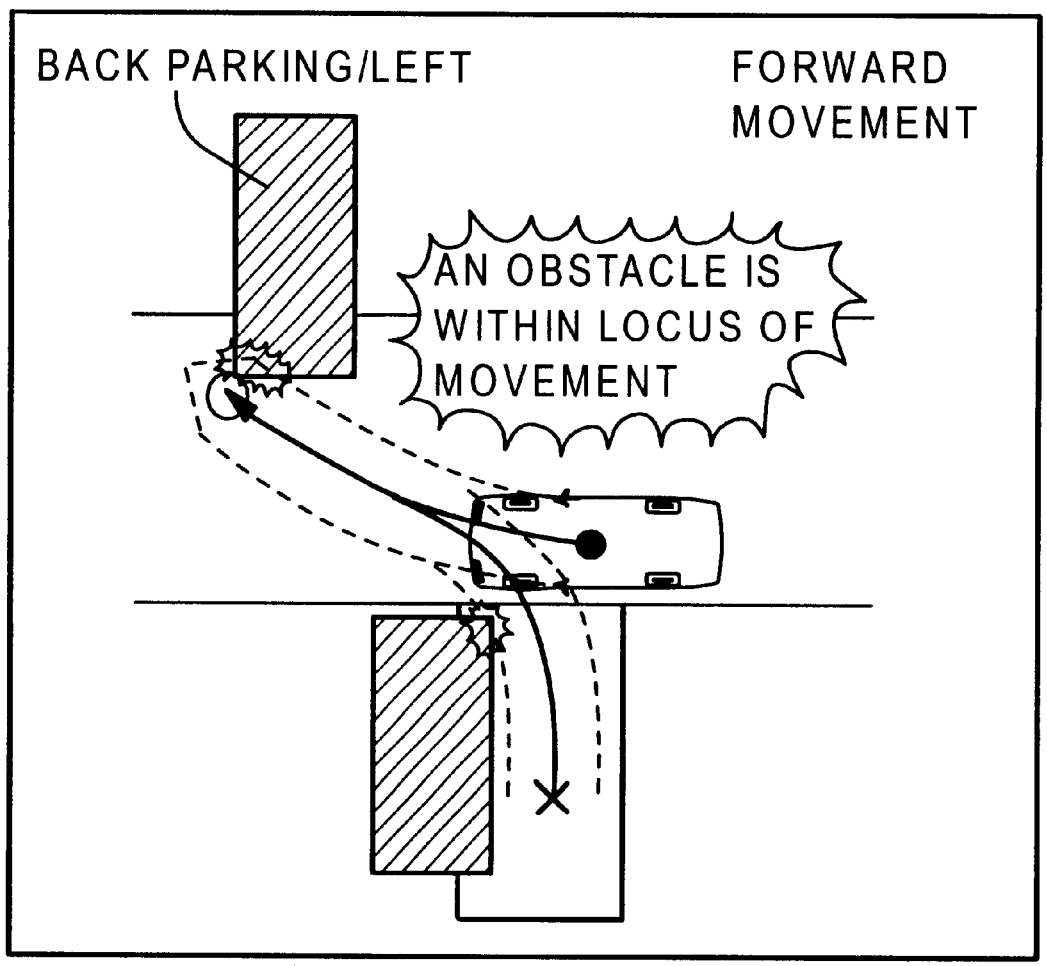

FIG. 4 illustrates a case where two parked vehicles partly protrude into the locus of movement of the subject vehicle to thereby become obstacles, at the start of the automatic parking control. In this case, the driver is informed that "there is an obstacle within the presumed locus of movement" by a voice from the speaker and at the same time, an area of interference of the subject vehicle and the obstacle is indicated on a picture surface of the operational stage display device 11, for example, by flashing-on/off, and the words "there is an obstacle within the locus of movement" indicated on the picture surface. In this case, it becomes obvious at a stage before the execution of the automatic parking control that the automatic parking control is not feasible due to the presence of the obstacles and hence, the need for a wasteful execution of the automatic parking control is eliminated, leading to a saving of time.

Figure 5:
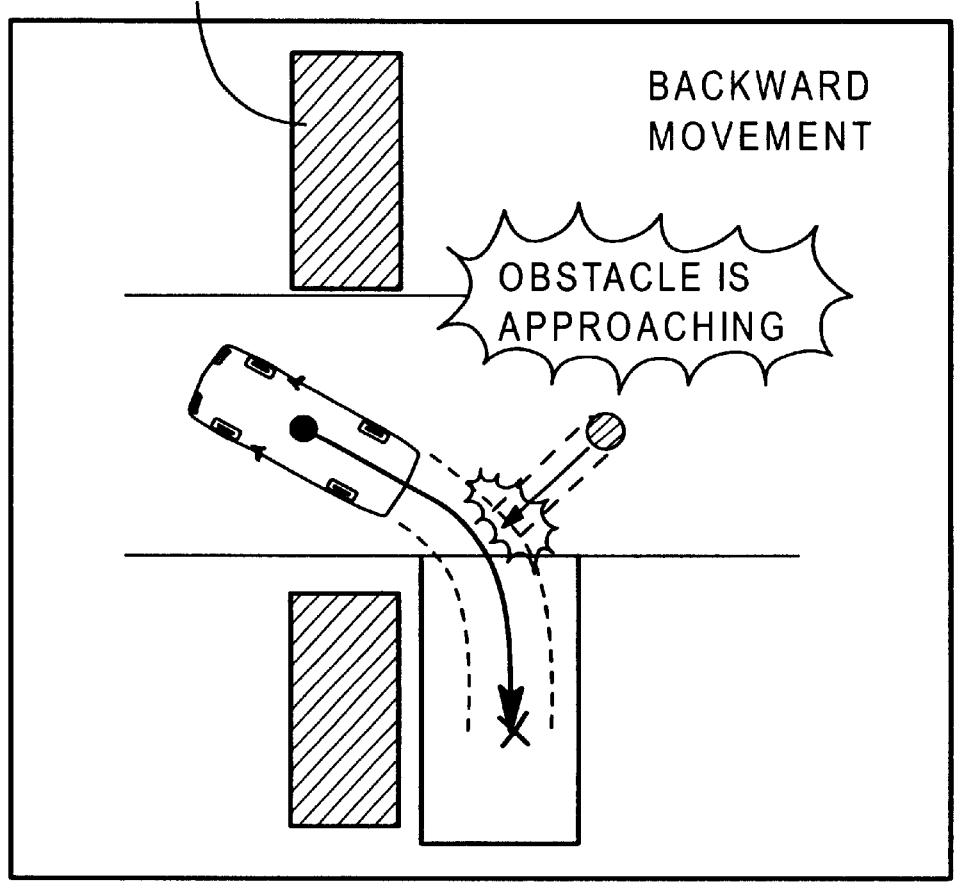

FIG. 5 illustrates a case where there is a possibility that a small animal or the like enters the locus of movement of the subject vehicle during the backward movement in the automatic parking control to become an obstacle. In this case, the driver is informed to "be careful because an obstacle is close to the subject vehicle" by a voice from the speaker, and at the same time, the area in which there is a possibility of interference between the subject vehicle and the obstacle is indicated on the picture surface of the operational stage display device 11, for example, by flashing-on/off, and the words "the obstacle is close to the subject vehicle" indicated on the picture surface.

When the determining section 24 has determined that there is a possibility of interference between the subject vehicle and the obstacle, the brake actuator 12 is operated by a command from the control section 22 to automatically stop the vehicle and at the same time, the automatic parking control is canceled. When the driver spontaneously acts to keep away from the obstacle by canceling the automatic parking control by the detection of the obstacle in the above manner, interference between the operation for keeping away from the obstacle and the automatic parking control is prevented.

When the automatic brake has been operated in the above manner, the operation of the automatic brake is canceled when the driver spontaneously depresses the brake pedal 9, whereby the amount of brake operation by the driver which is larger than the predetermined amount, to stop the vehicle is detected by the brake operation detecting means $S_4$, or when the driver operates the selecting lever 10 to the "P" position. Thus, the need for the driver to conduct a special canceling operation is eliminated, leading to an enhanced operability.

A second embodiment of the present invention will now be described with reference to FIGS. 6A to 6C.

Although the picture images around the subject vehicle made based on the output from the sonar or radar, have been projected on the picture surface of the operational stage display device 11 in the first embodiment, an image from a television camera mounted on the vehicle, as the object detecting means $S_6$ is projected, and the locus of movement of the subject vehicle is superimposed onto this image in the second embodiment. All of the eight sonar or radar detecting means in the first embodiment may be replaced by television cameras, or one or more of them may be replaced by a television camera. Preferably, at least one television camera is mounted at each of the front and rear portions of a vehicle body. During forward movement of the vehicle, the image from the television camera mounted at the front portion of the vehicle body is projected, and during backward movement of the vehicle, the image from the television camera mounted at the rear portion of the vehicle body is projected, whereby it is possible for the driver to further reliably grasp the position of the subject vehicle and the surrounding situation.

Figure 7:
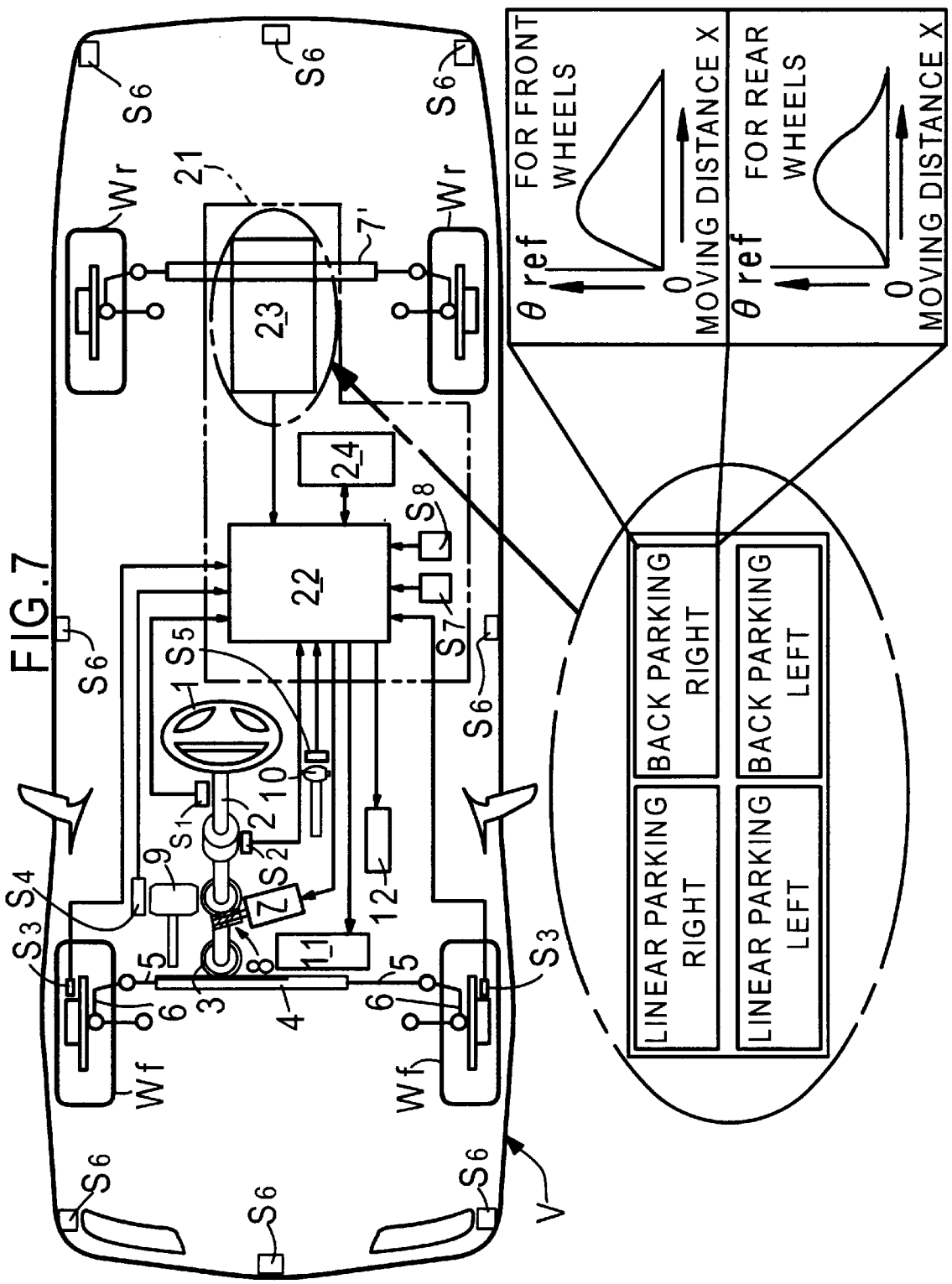
Figure 8A:
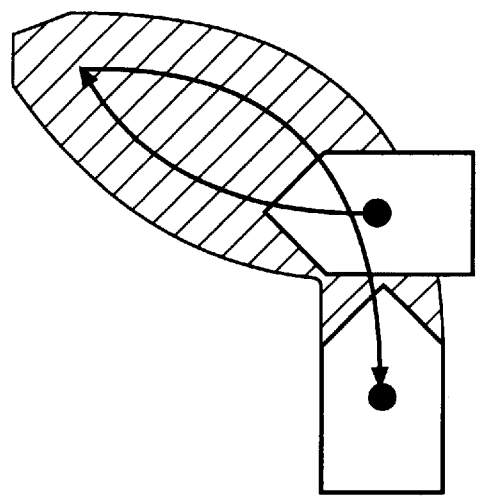
Figure 8B:
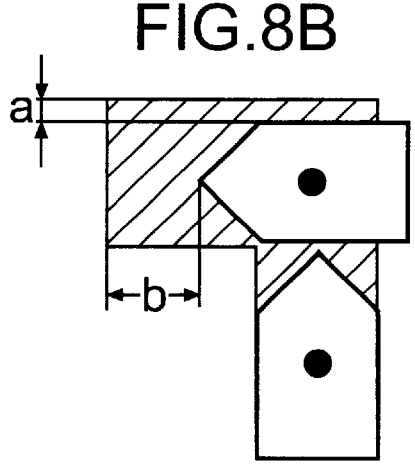
Figure 8C:
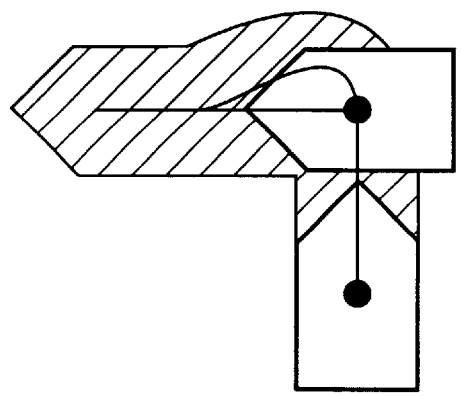

FIGS. 7 and 8A to 8C illustrate a third embodiment of the present invention. FIG. 7 is an illustration of the entire arrangement of a vehicle equipped with a front and rear wheel steering control system, and FIGS. 8A to 8C are illustrations for explaining the operation.

In the third embodiment, the present invention is applied to a front and rear wheel-steered vehicle in which front wheels Wf, Wf and rear wheels Wr, Wr are steerable, and which includes a steering actuator 7' for the rear wheels Wr, Wr in addition to the steering actuator 7 for the front wheels Wf, Wf.

When the front wheels Wf, Wf and the rear wheels Wr, Wr are independently steered, reference steering angles θref for the front wheels Wf, Wf and the rear wheels Wr, Wr are previously stored in the memory section 23, and the control section 22 controls the operations of both the steering actuators 7 and 7', so that the steering angles θ of the front wheels Wf, Wf and the rear wheels Wr, Wr are equalized to the reference steering angles θref, respectively.

When the steering angle θ of the rear wheels Wr, Wr is controlled in proportion to the steering angle θ of the front wheels Wf, Wf, only the reference steering angle θref for the front wheels Wf, Wf is previously stored in the memory section 23, and the control section 22 controls the operation of the steering actuator 7, so that the steering angle θ of the front wheels Wf, Wf is equalized to the reference steering angle θref, and the control section 22 controls the operation of the steering actuator 7', so that the steering angle θ of the rear wheels Wr, Wr is equalized to a value proportional to the reference steering angle θref.

As also shown in FIGS. 2 to 5, a space required when the front wheel-steered vehicle in the first embodiment is parked in the back parking/left mode is a space shown by drawing oblique lines in FIG. 8A. A space required when the front and rear wheel-steered vehicle in the third embodiment is parked in the back parking/left mode is a small space shown by drawing oblique lines in FIG. 8C. This is closely allied to a minimum space with the areas shown by a and b in FIG. 8B being reduced as much as possible.

In the third embodiment, a selecting means such as a switch may be provided in the vicinity of a driver's seat, so that the driver can select a front wheel steering mode or a front and rear wheel steering mode, or the size of a parking space may be determined based on the result of detection by the object detecting means $S_6$, thereby selecting a front wheel steering mode or a front and rear wheel steering mode.

A fourth embodiment of the present invention will now be described with reference to FIGS. 9 to 16B.

Figure 9:
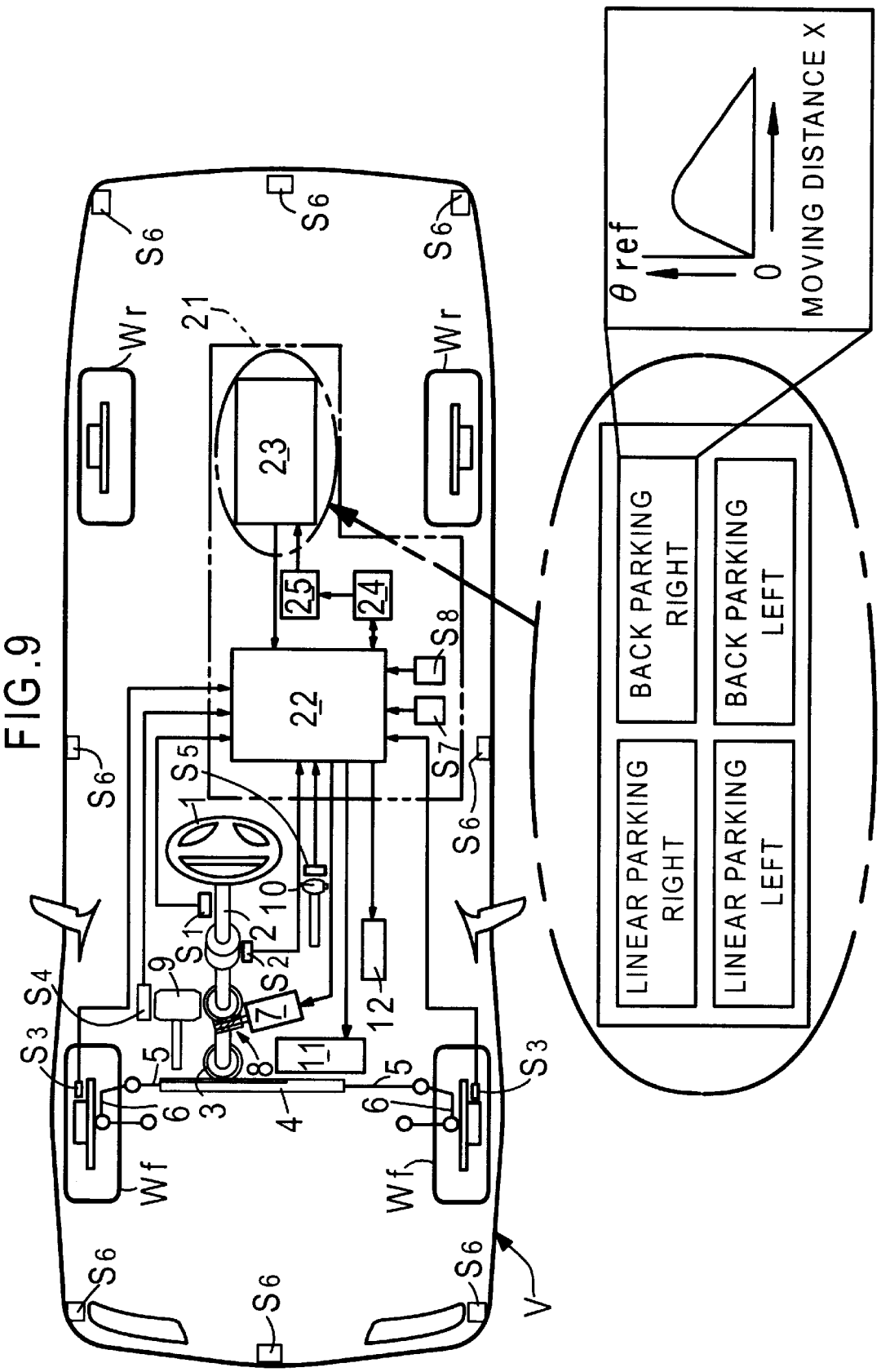

As can be seen by comparison of FIG. 9 with FIG. 1, a vehicle V in the fourth embodiment includes a correcting section 25 connected to the memory section 23 and the determining section 24. When there is a possibility of contact of the vehicle with an obstacle during an automatic parking control, the correcting section 25 corrects data for a parking mode stored in the memory section 23 to avoid the contact of the vehicle with the obstacle.

The contents of an automatic parking control will be described with the back parking/left mode (the mode in which the parking is conducted while the vehicle is being moved backwards to a parking position lying on the left side of the vehicle) taken as an example.

Figure 10:
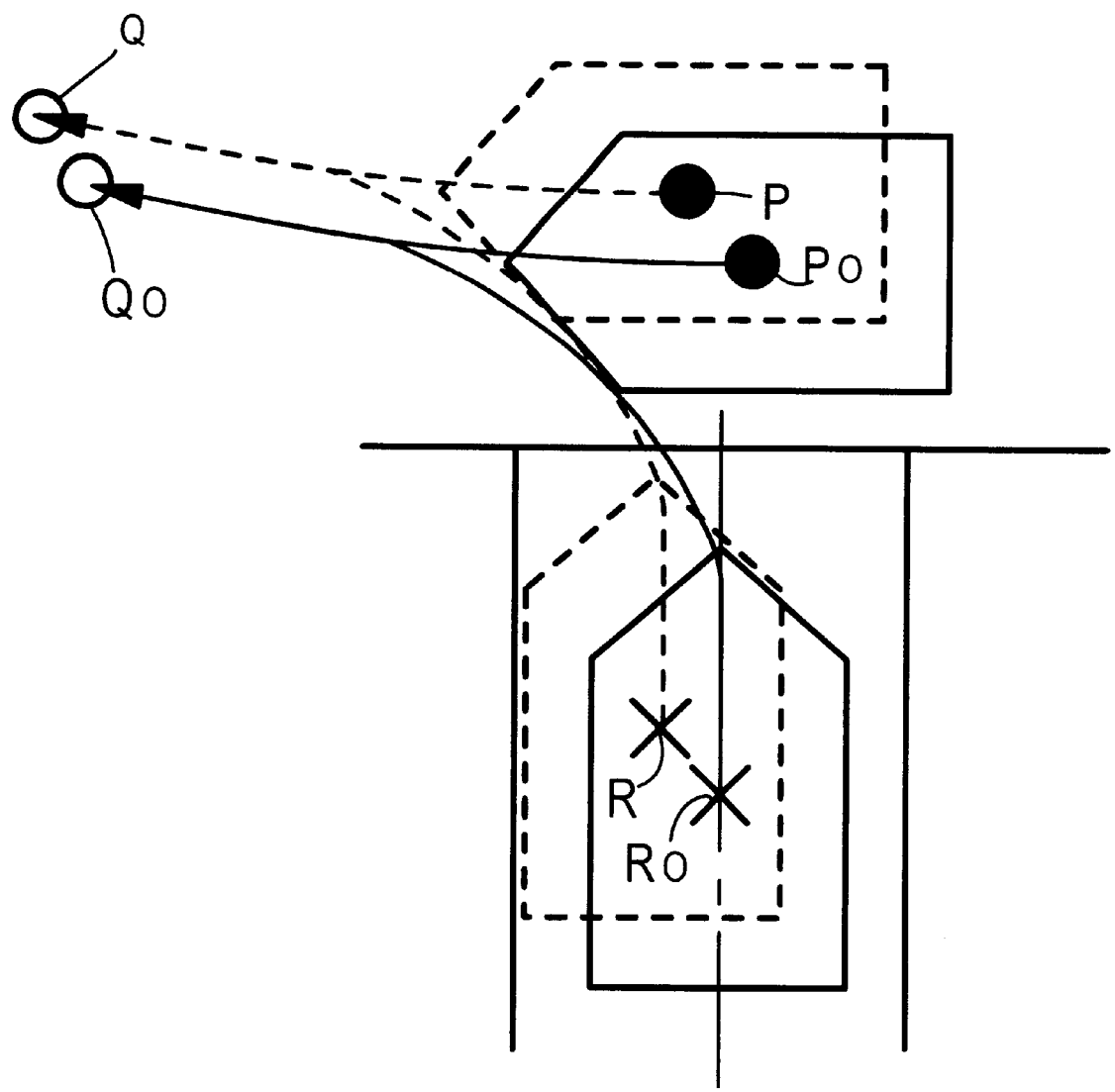

First, in a state in which the vehicle has been moved near a garage where the vehicle is to be parked, so that left side of the vehicle body has been located as close as possible to the inlet line of the garage, as shown in FIG. 10, the vehicle is stopped at a position (a start position) at which a predetermined reference point (e.g., a left sideview mirror) is matched with a center line of the garage. When the mode selecting switch $S_7$ is operated to select the back parking/left mode and the automatic parking start switch $S_8$ is turned ON, the automatic parking control is started. While the automatic parking control is being performed, the current position of the subject vehicle, a surrounding obstacle, the parking position, a presumed locus of movement of the subject vehicle from the start position to the parking position, the shifting position for the switch-over from the forward movement to the backward movement and the like are indicated on the operational stage display device 11, and in addition to this, various instructions and warnings are emitted by voice from the speaker to the driver.

In stopping the vehicle at the start position to start the automatic parking control, the position at which the vehicle is actually stopped may be deviated from the desired start position in some cases. In such a case, the vehicle which was to be moved through a locus of movement shown by the solid line in FIG. 10 to reach the parking position by the automatic parking control, is actually moved through a locus of movement shown by a dashed line in FIG. 10 due to the deviation of the start position, and the final parking position is deviated from the target parking position. The optimal parking position is varied depending upon the surrounding situation around the parking position (depending upon the fact that there are other vehicles parked on left and right opposite sides, or that there is another vehicle parked on either left or right side, or that there is no other vehicle parked on left and right opposite sides). Therefore, in the present invention, an optimal parking position Ro is determined based on the surrounding situation (mainly, a wall or another vehicle or the like, when the object detecting means $S_6$ are sonar or radar, or mainly, a white line or the like, when the object detecting means $S_6$ are the television cameras) detected by the object detecting means $S_6$, when the vehicle is stopped at the start position.

Figure 12A:
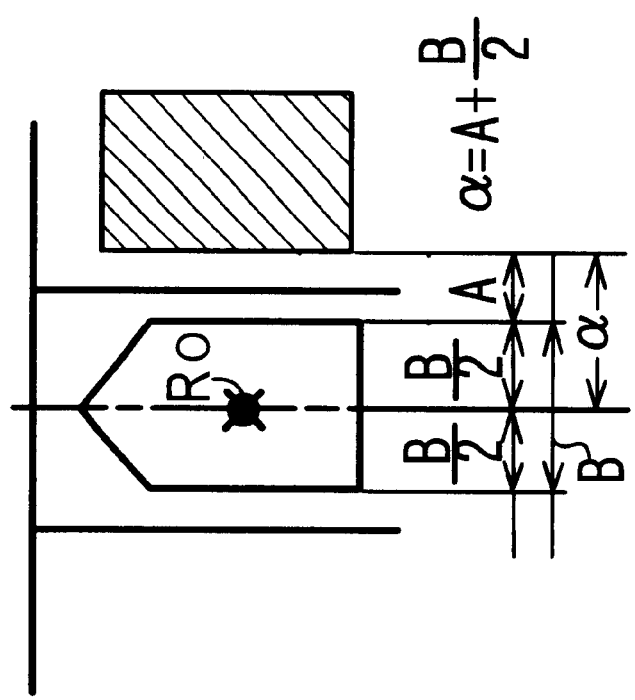
FIGS. 12A and 12B are illustrations for explaining a method for determining an optimal parking position in the back parking/left mode.
Figure 12B:
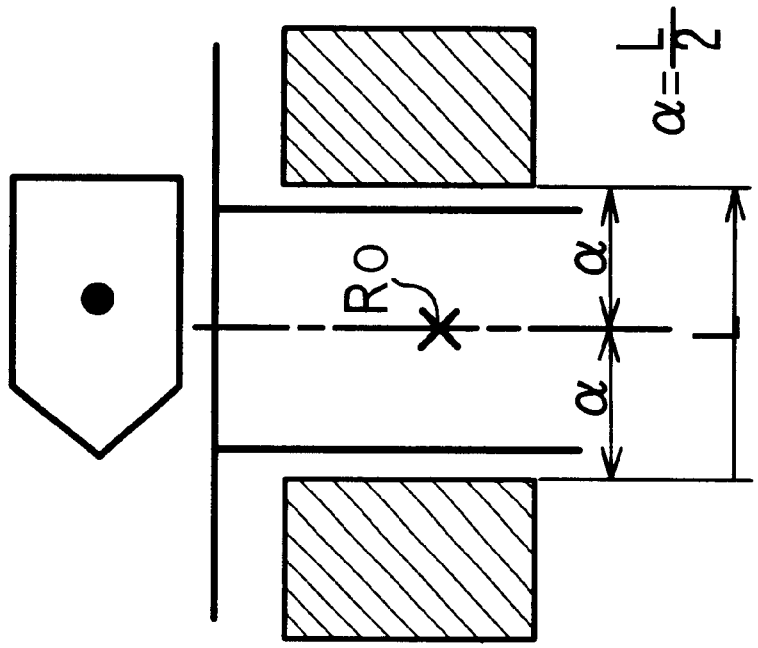

FIGS. 12A and 12B are illustrations for explaining a technique for determining the optimal parking position Ro in the back parking/left mode. FIG. 12A shows a case where there are other vehicles as obstacles on left and right opposite sides of the parking position. In this case, the optimal parking position Ro is established so that it is located at the center of a distance L between the left and right other vehicles, i.e., so that the center line of the vehicle body is located at a point spaced at a distance α=L/2 apart from the left and right other vehicles. If the distance L is smaller than the spacing in which the subject vehicle can be parked, then the determining section 24 determines that there is an obstacle existing on the locus of movement of the subject vehicle, and the driver is informed by the picture image and the voice from the operational stage display device 11.

FIG. 12B shows a case where there is another vehicle on the right side of the parking position. In this case, in order to ensure enough space to open a right door of the parked subject vehicle, an optimal parking position Ro is established at a location where a distance A for opening and closing the door can be ensured between the right side of the subject vehicle and the left side of the other vehicle. Therefore, if the vehicle width is represented by B, the optimal parking position Ro is established so that the distance α between the center line of the vehicle body and the other vehicle is equal to A+B/2, when the vehicle is in the optimal parking position Ro.

When there is another vehicle existing on the left side of the parking position, an optimal parking position Ro is established at a location so that the distance α between the center line of the vehicle body and the other vehicle is equal to A+B/2 to ensure enough space to open a right door of the other vehicle in order to ensure a distance A between the left side of the subject vehicle and the right side of the other vehicle. Further, when there is no obstacle on the left and right opposite sides of the parking position, the establishment of an optimal parking position Ro is not carried out, and a parking position R presumed from the start position is employed directly as an optimal parking position Ro.

The optimal parking positions Ro in FIGS. 12A and 12B are established at the center of the left and right white lines of the parking position, when the object detecting means $S_6$ is sonar or radar and when the object detecting means $S_6$ is the television camera. When the left and right white lines cannot be detected, the establishment of an optimal parking position Ro is not carried out, and a parking position P presumed from the start position, is employed directly as an optimal parking position Ro.

When the optimal parking position Ro has been established in the above manner, an optimal locus of movement can be determined by superimposing a terminal end of the locus of movement onto the optimal parking position Ro. In FIG. 10, a dashed line indicates a locus of movement when the vehicle is started from an actual start position; and a solid line indicates an optimal locus of movement. If the automatic parking control is carried out from the actual start position P, the vehicle is moved, while describing the locus of movement shown by the dashed line, to reach a shifting position Q, and moved therefrom through the locus of movement shown by dashed line to reach the parking position R. However, if the vehicle started from the start position P can be guided to an optimal shifting position Qo on the optimal locus of movement shown by the solid line rather than to the shifting position Q on the locus of movement shown by the dashed line, the vehicle can reach the optimal parking position Ro through the optimal locus of movement shown by the solid line.

Figure 11:
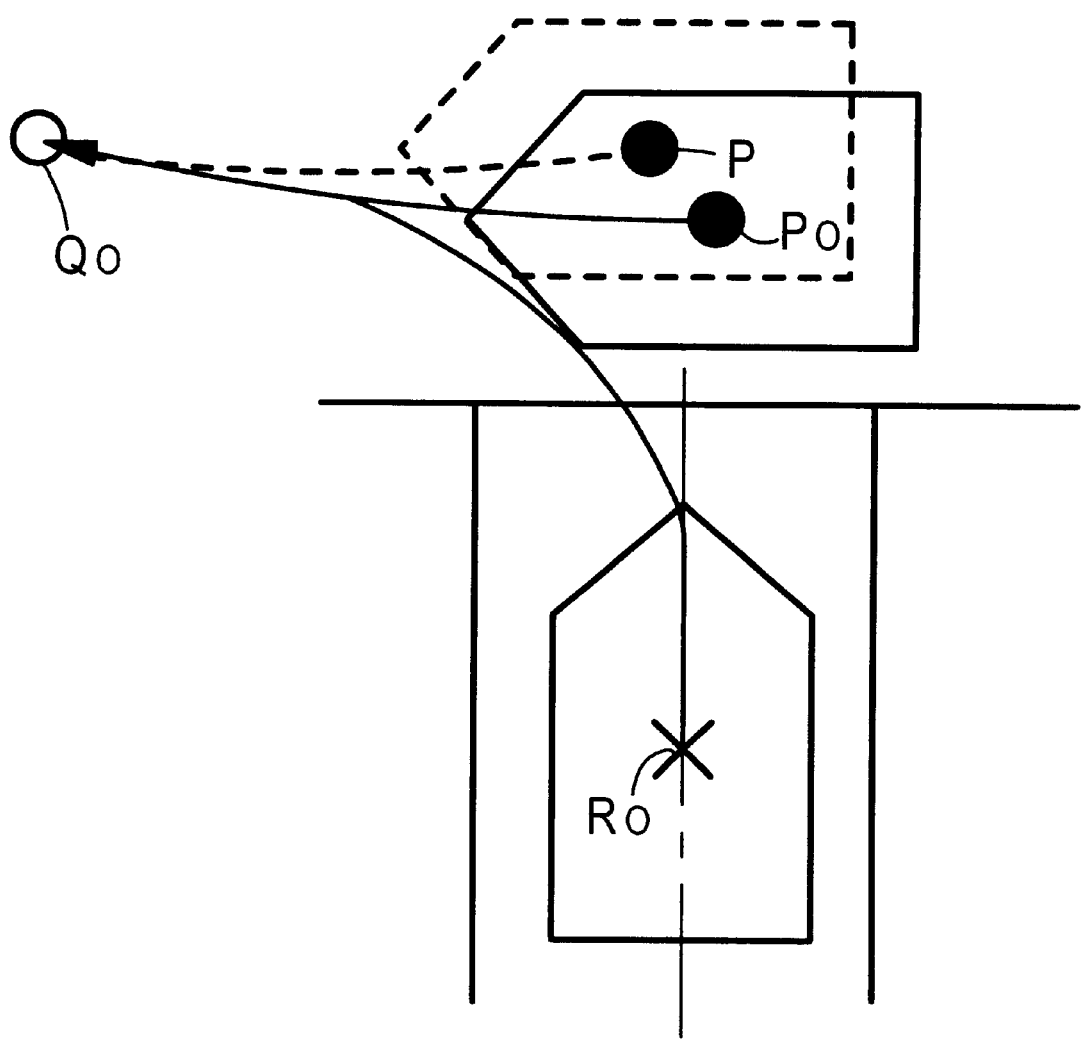

Therefore, in the present invention, while the vehicle is being moved from the start position P to the shifting position Q, as shown in FIG. 11, the locus of movement is corrected to ensure that the vehicle is guided to the optimal shifting position Qo. Specifically, the correcting section 25 corrects the data of the locus of movement outputted by the memory section 23 based on the command from the determining section 24. Thus, even if the start position P of the vehicle is deviated from the optimal start position Po, or even if the situation of the obstacle around the parking position is varied, appropriate automatic parking control can always be performed.

Figure 13:
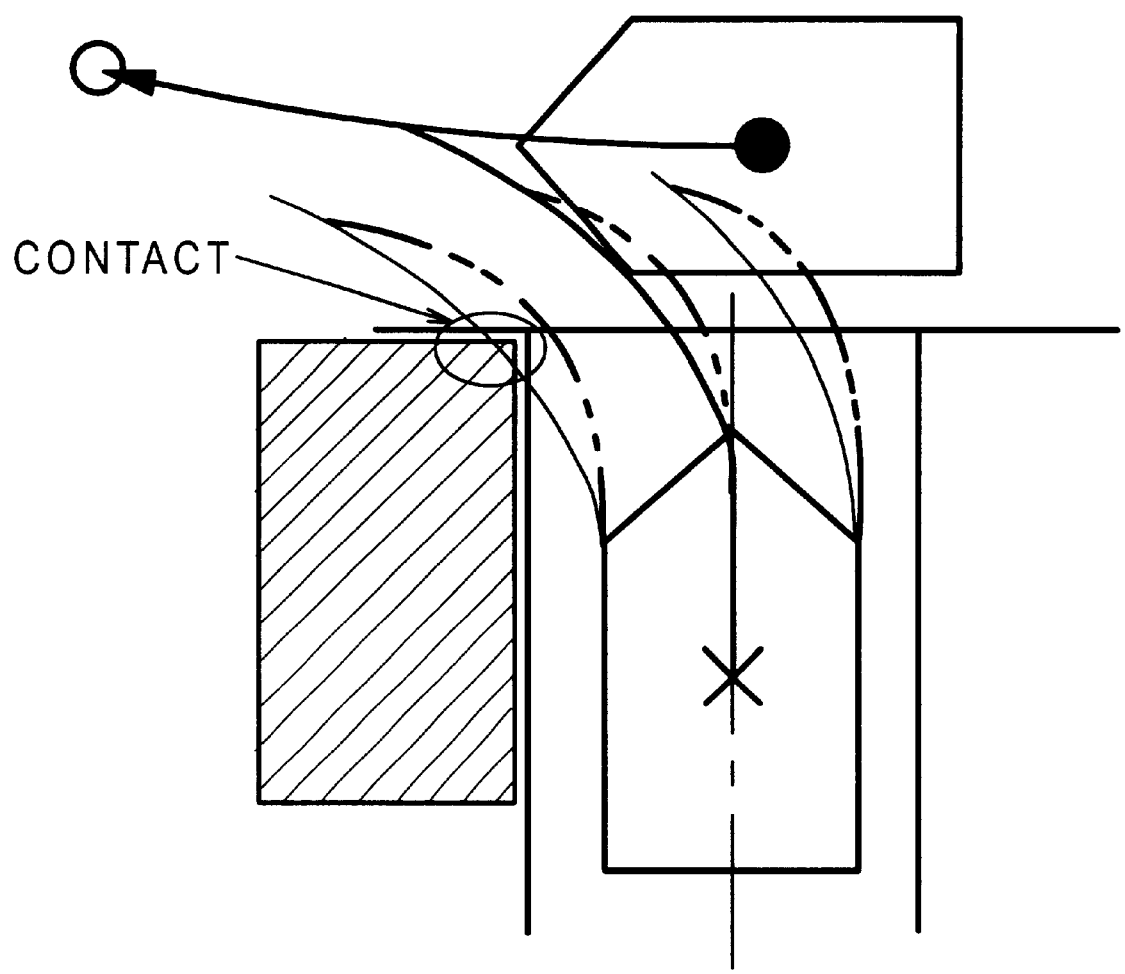

For example, if the locus of movement from the optimal shifting position Qo to the optimal parking position Ro slightly interferes with an obstacle, the correcting section 25 corrects the locus of movement of the vehicle based on the command from the determining section 24 to enable the parking of the vehicle. FIG. 13 illustrates one example of such case, wherein the locus of movement is corrected as shown by a dashed line to avoid the contact of the left rear portion of the vehicle with the obstacle, by the automatic parking control when the vehicle is being moved backward.

The operation when the linear parking is to be carried out in the linear parking/left mode will be described below.

Figure 14:
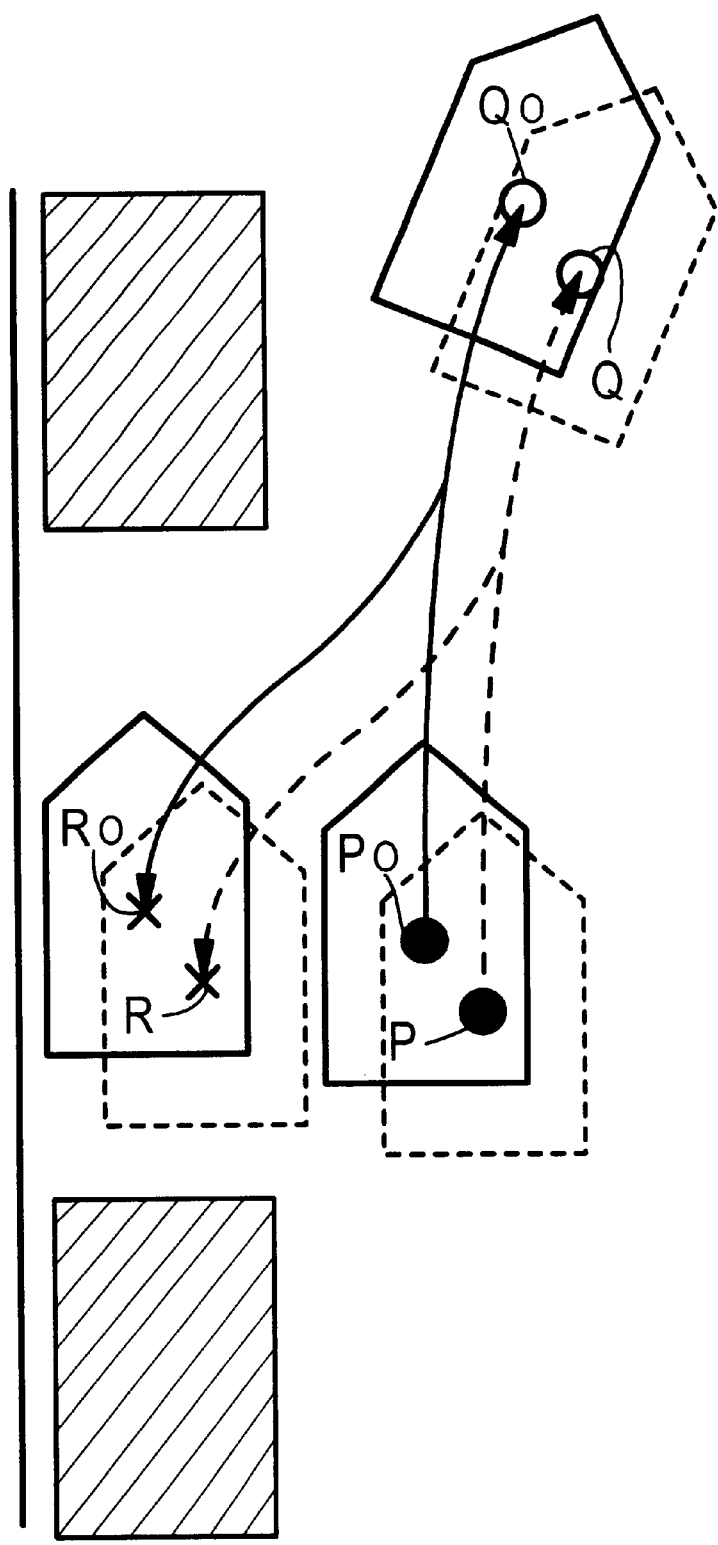
Figure 15:
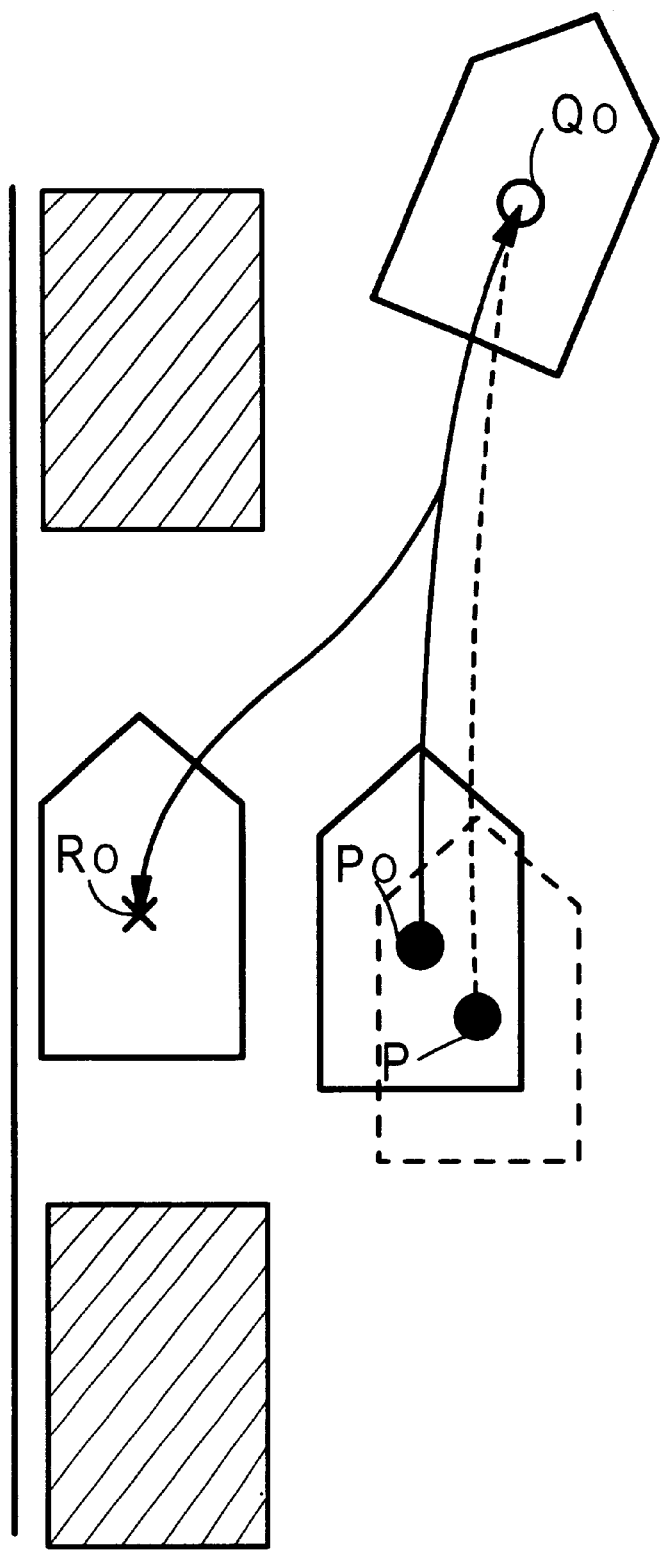

To carry out the parking of the vehicle in the linear parking/left mode in the presence of obstacles in front and in rear of the parking position, as shown in FIG. 14, the vehicle is stopped at the start position P on the right side of the parking position to start the automatic parking control. The vehicle is moved forward to the shifting position Q and then backwards to the parking position R, thereby completing the parking. In this case, an optimal parking position Ro is determined based on the surrounding situation detected by the object detecting means $S_6$ at the start position P, and an optimal shifting position Qo is determined by an inverse calculation from the optimal parking position Ro and the locus of movement. If the optimal shifting position Qo is deviated from the intrinsic shifting position Q, the correcting section 25 corrects the locus of movement of the vehicle based on the command from the determining section 24, as shown in FIG. 15, to guide the vehicle from the start position P to the optimal shifting position Qo to park the vehicle, whereby the vehicle can be parked at the optimal parking position Ro through a subsequent backward movement.

A technique for determining an optimal parking position Ro when linear parking of the vehicle is to be carried out in the linear parking/left mode will be described below with reference to FIGS. 16A and 16B.

Figure 16A:
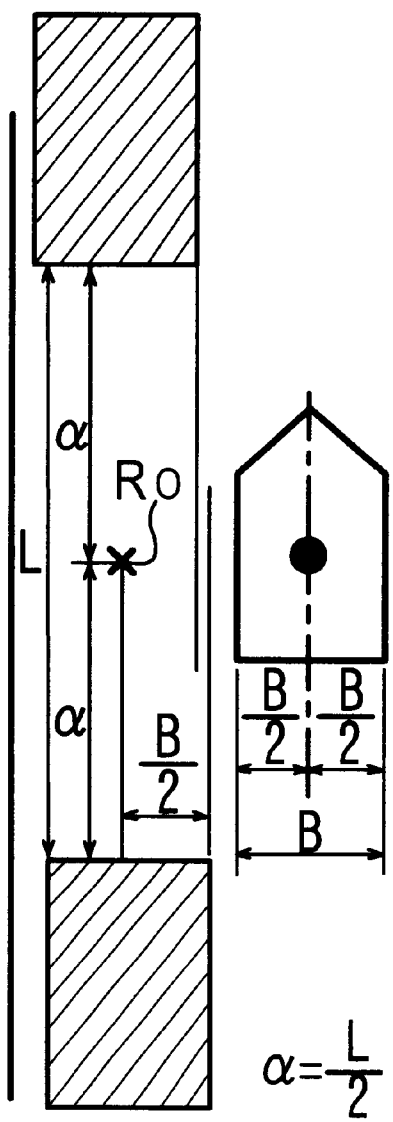
FIGS. 16A and 16B are illustrations for explaining a method for determining an optimal parking position in the linear parking/left mode.

FIG. 16A shows a situation where there are obstacles existing in front and in rear of the parking position. In this case, an optimal parking position Ro is determined at a location in which the right side of the subject vehicle is in line with a right side of one of the front and rear obstacles, which protrudes toward the center of a road (i.e., the obstacle in rear of the subject vehicle in FIG. 16A), and the subject vehicle is located centrally between the front and rear obstacles. When the distance L between the front, and rear obstacles is smaller than a required distance, the determining section 24 determines that automatic parking control is not feasible, and this is informed to the driver from the operational stage display device 11 by the picture image and the voice.

Figure 16B:
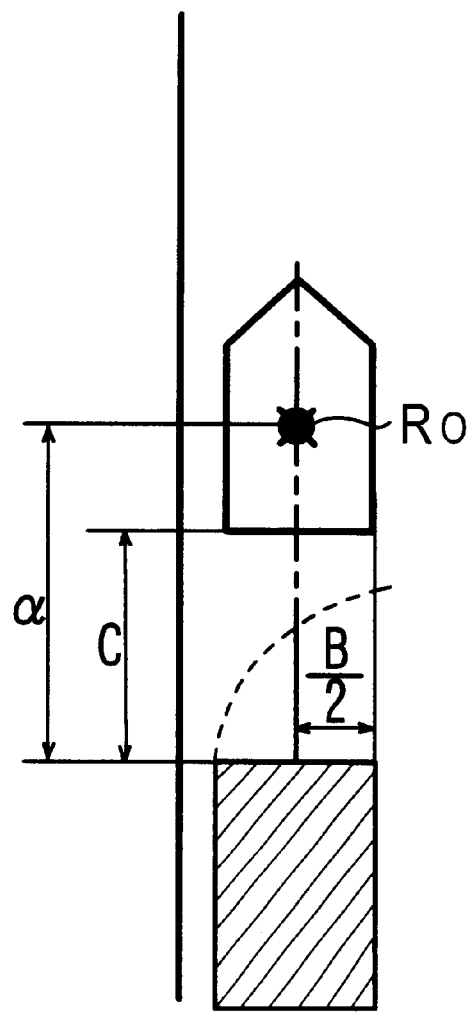

FIG. 16B shows a situation where there is an obstacle existing only in the rear of the parking position. In this case, an optimal parking position Ro is determined at a location in which the right side of the vehicle is in line with a right side of the obstacle, and in the situation where the obstacle is a vehicle, a distance C between a rear end of the subject vehicle and a front end of the obstacle, permitting escape of the vehicle must be ensured. When there is an obstacle existing only in front of the parking position, an optimal parking position Ro is determined at a location in which a distance C between a front end of the subject vehicle and a rear end of the obstacle, permitting escape of the subject vehicle to be ensured. When there is no obstacle in front or in the rear of the parking position, the determination of an optical parking position Ro is not carried out, and a parking position P presumed from the start position is employed as an optimal parking position Ro.

A fifth embodiment of the present invention will now be described.

A vehicle V in the fifth embodiment is switchable between a two-wheel steered state in which only front wheels Wf, Wf can be steered by the steering actuator 7, and a four-wheel steered state in which both of the front wheels Wf, Wf and rear wheels Wr, Wr can be steered by the steering actuator 7. The memory section 23 has data for four parking modes previously stored therein in correspondence to both of the two-wheel steered state and the four-wheel steered state. The determining section 24 determines whether the automatic parking is feasible in the two-wheel steered state, or the automatic parking is feasible in the four-wheel steered state even if the automatic parking is not feasible in the two-wheel steered state, depending upon the surrounding situation around the parking position detected by the object detecting means $S_6$. On the basis of this determination, data for the two-wheel steered state or data for the four-wheel steered state are selected from the memory section 23.

FIG. 17A shows a situation where in carrying out the automatic parking in the back parking/left mode, the subject vehicle will contact an obstacle in the two-wheel steered state because the vehicle is incapable of a small sharp turn. In this case, the data for the four-wheel steered state is selected based on the determination provided by the determining section 24, and the contact of the vehicle with the obstacle can be avoided by performing the automatic parking in the four-wheel steered state in which the vehicle is capable of a small sharp turn as shown in FIG. 17B.

Figure 18A:
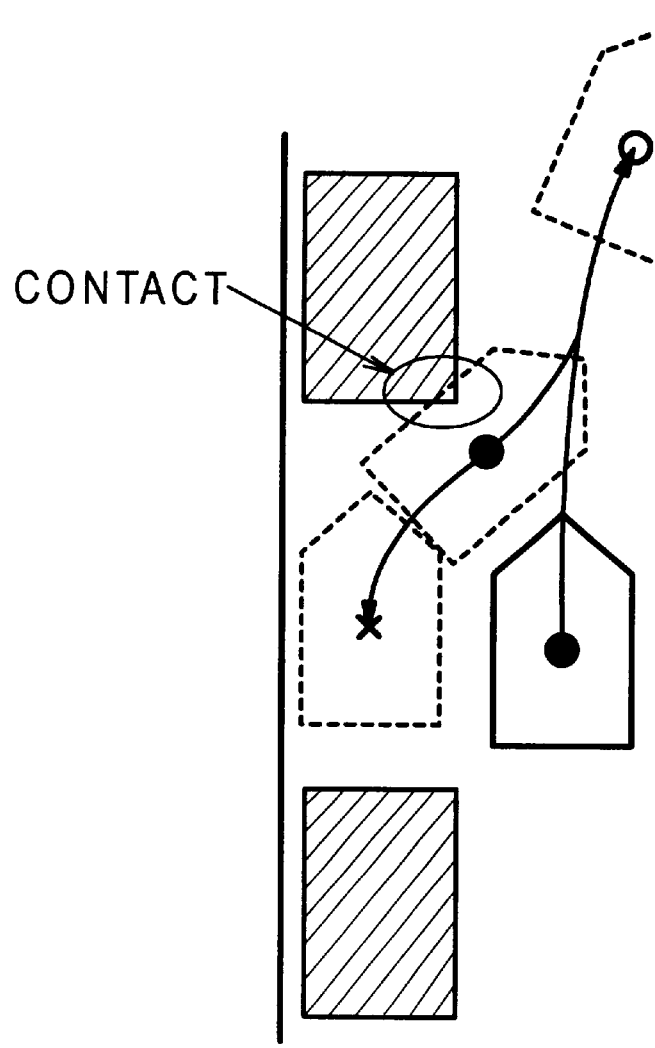
Figure 18B:
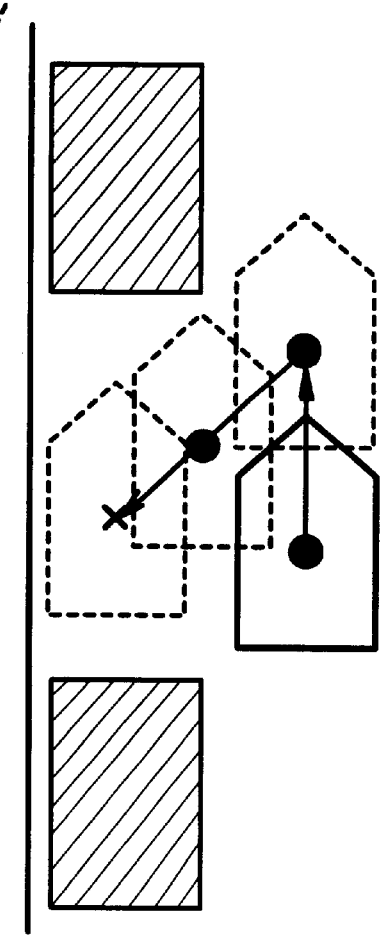

FIG. 18A shows a situation where in carrying out the automatic parking in the linear parking/left mode, the subject vehicle will contact an obstacle in the two-wheel steered state in which the vehicle is incapable of a small sharp turn. In this situation, the data for the four-wheel steered state is selected based on the determination provided by the determining section 24, and the contact of the vehicle with the obstacle can be avoided by conducting the automatic parking in the four-wheel steered state in which the vehicle is capable of a small sharp turn as shown in FIG. 18B.

Although the embodiments of the present invention have been described in detail, it will be understood that the present invention is not limited to the above-described embodiments, and various modifications in design may be made without departing from the spirit and scope of the invention defined in claims.

What is claimed is:

1. An automatic steering system for a vehicle, comprising a steering actuator for steering vehicle wheels based upon the steering by a driver, a memory means having stored therein a locus of movement of the vehicle to a target position, a control means for switching from control of the steering actuator by the operator to control of the steering actuator based on the locus of movement stored in the memory means, and an object detecting means for detecting an object near the vehicle, said automatic steering system further including a determining means coupled to an output of said object detecting means, for determining based upon the output of said object detecting means, the presence of an object within the locus of movement or which may become an obstacle which enters into the locus of movement, during the controlling of said steering actuator based upon the locus of movement stored in said memory means, and, a correcting means for correcting the locus of movement stored in said memory means, when said determining means determines the presence of an object which becomes an obstacle in the locus of movement.

2. An automatic steering system according to claim 1, wherein said correcting means corrects the relationship of a steering angle of the wheels to a distance of movement of the vehicle stored in said memory means.

3. An automatic steering system according to claim 1, wherein said steered wheels are front and rear wheels, and said memory means stores a first locus of movement when one of the front and rear wheels is steered, and a second locus of movement when both of the front and rear wheels are steered.

4. An automatic steering system according to claim 3, wherein said first or second locus of movement is selected based on the determination in said determining means.

\* \* \* \* \*